Sept. 26, 1967
R. L. ELKINS
3,343,279
TEACHING AID
Filed Oct. 22, 1965
2 Sheets-Sheet 1
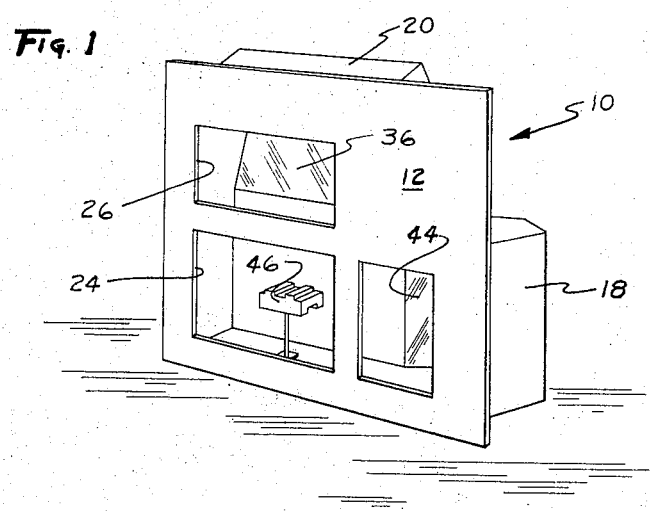
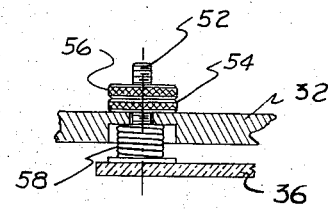
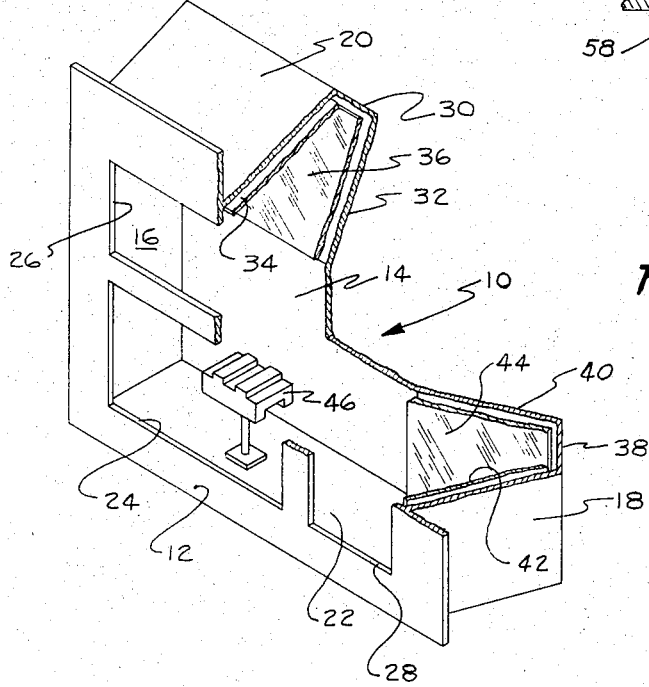
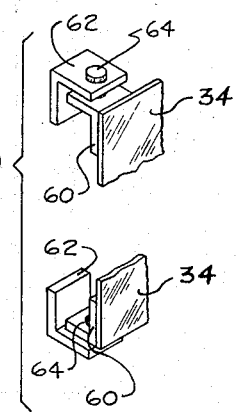
INVENTOR.
RICHARD L. ELKINS
BY
Pattison, Wright & Pattison Sept. 26, 1967   R. L. ELKINS   3,343,279
TEACHING AID
Filed Oct. 22, 1965   2 Sheets-Sheet 2
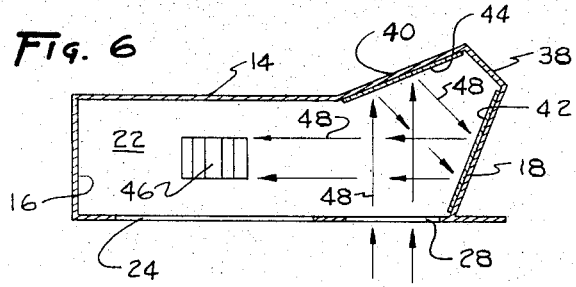
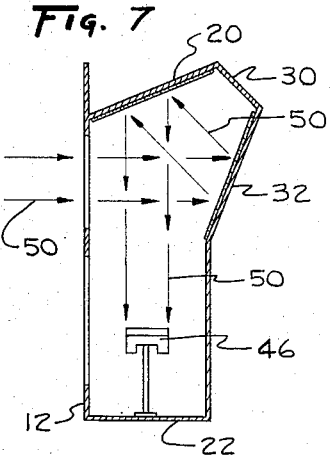
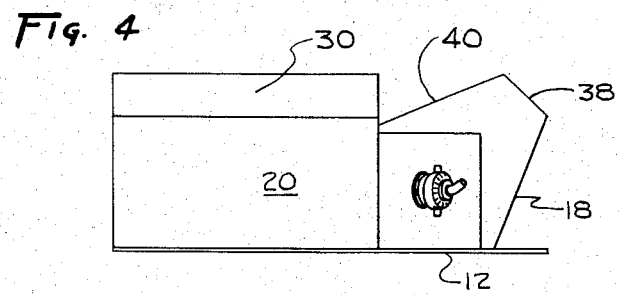
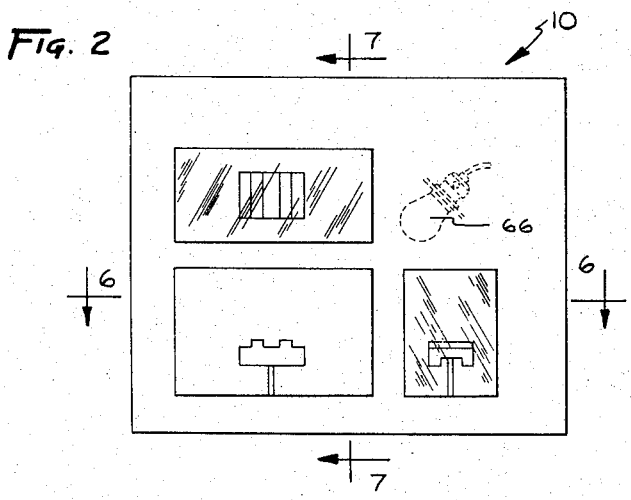
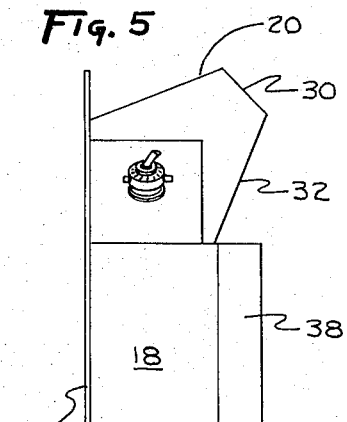
INVENTOR.
RICHARD L. ELKINS
BY
Pattison, Wright & Pattison United States Patent Office 3,343,279
Patented Sept. 26, 1967

3,343,279
TEACHING AID
Richard L. Elkins, 110 Lillian Lane,
Silver Spring, Md. 20904
Filed Oct. 22, 1965, Ser. No. 502,224
8 Claims. (Cl. 35—26)

The present invention relates to new and useful improvements in educational teaching aids and more particularly and specifically to a novel and useful device for instructing mechanical drawing and drafting.

Heretofore numerous and varied devices have been developed and made available for use in the instruction of drafting or mechanical drawing, including certain devices specifically adapted to the teaching of view projections of inanimate objects. All of the known prior art devices have lacked inherent accuracy, simplicity and the ability to be produced at low cost. Additionally, certain of the prior art devices have been complex and delicate in use, in addition to being costly.

It is a primary object of the present invention to provide a device for use in instructing proper view projections in drafting or mechanical drawing which visually reproduces and optically projects each proper view for the student.

Another object of the present invention rests in the provision of a unique teaching aid which optically pictures and projects to a single focal point the three views normally and technically required in a three-view projection drawing.

A still further object of this invention resides in the provision of a teaching aid for drafting and specifically for third angle orthographic projection which is highly adaptable for use in closed circuit television demonstration and instruction, such as is being used extensively in educational institutions today.

Still another object and advantage of the present invention is the provision of a simple and inexpensive educational aid for instruction of multi-view orthographic projection which is simple and effective in use, and which is sturdy and durable.

Still other objects and advantages of the present invention will become more readily apparent to those skilled in the art when the following description is read in the light of the accompanying drawings.

Referring now to the accompanying drawings in which like numerals designate similar parts throughout the several views:

FIG. 1 is a pictorial perspective view of the teaching aid.

FIG. 2 is a front elevational view of the teaching aid.

FIG. 3 is a perspective view with fragmentary portions broken away and illustrated in cross section.

FIG. 4 is a top plan view of the teaching aid.

FIG. 5 is an end elevational view of the teaching aid.

FIG. 6 is a horizontal section taken on line 6—6 of FIG. 2.

FIG. 7 is a vertical section taken on line 7—7 of FIG. 2.

FIG. 8 is a fragmentary section of the adjustable mounting means for one of the mirror elements.

FIG. 9 is a fragmentary perspective illustrating a fixed mounting means for one of the mirror elements.

With reference to the accompanying drawings in which there is illustrated an operative embodiment of the present invention, 10 generally designates a substantially elongated housing having a front wall 12, a back wall 14, one end wall 16, a second end wall 18, a top 20 and a bottom 22.

The front wall 12 is provided in a lower, off-center position thereof with a rectangular opening 24 forming a viewing window. A second viewing window 26 is formed in the front wall 12 in direct vertical alignment above window 24. A third viewing window 28 is formed in the front wall in horizontal alignment with and to the right, facing the housing, of the first viewing window 24.

The top wall 20, above windows 24 and 26, is inclined from the front wall 12 upwardly and rearwardly where it connects with a wall section 30 inclined downwardly and rearwardly to joint with the upper end of an upwardly and outwardly inclined section 32 of the rear wall 14. A reflective surface or mirror 34 is secured against the inner face of the inclined top wall 20, and a second reflective surface or mirror 36 is secured to the inner face of inclined rear wall section 32. Reflective surface or mirror 36 lies at an angle to mirror 34 and in the same front to rear alignment with the viewing window 26.

End wall 18 of the housing is angularly disposed outwardly and rearwardly from the front wall 12 to a point where it joins a short angular wall section 38 extending rearwardly and inwardly of the housing to a point of jointure with an outward projecting section 40 of the rear wall 14. A reflective surface or mirror 42 is secured to the end wall 18, and a second reflective surface or mirror 44 is secured to the inner surface of rear wall section 40 in front to rear alignment of said housing with the third viewing window 28. Each of the mirrors 34, 36, 42 and 44, may be secured to the supporting housing wall by means of threaded studs 52 secured at spaced points on the rear of the mirror with each extending through the adjacent housing wall and receiving an adjusting nut 54 and a locking nut 56 thereon externally of said housing wall. A coil spring 58 is positioned about each stud 52 intermediate the rear face of the mirror and the adjacent housing wall, said spring being compressed between said mirror and said wall by tightening of the adjusting nut 54. Complementary adjustment of the nuts on the several studs mounting a mirror enable the adjustment of the angularity of the mirror relative to the supporting housing wall.

In FIG. 9 of the drawings there is illustrated structure for fixedly mounting a mirror (i.e., 34, 42) to an adjacent housing wall. The mirror is provided on the rear surface, at spaced points thereof, with a plurality of L-shaped brackets 60. The adjacent housing wall at complementary locations thereon is provided with similar brackets 62. The oppositely projecting tabs or legs of the mirror and wall brackets are overlapping and a pin or threaded fastener 64 is engaged vertically through them to secure the mirror to the wall.

It is further contemplated that each of the mirrors may be pivotally secured along one vertical edge by use of the interlocking pin support of FIG. 9 with the second vertical edge adjustably secured by a single stud arrangement as in FIG. 8.

A light source, such as an electric lamp, 66, may be mounted within the housing 10 at an elevated location therein generally above window 28 and to the right of window 26 to be focused on the top and optically projected side of the drawing object to enhance the visibility of the object in the two reflected views thereof.

In use of the structure hereinbefore described, an inanimate drawing subject or object 46 is supported on the housing bottom to be positioned centrally within the viewing window 24 in the front wall of the housing. With reference to FIG. 6 of the drawings, it is then seen that the right hand side or elevation of the subject or object 46 may be viewed from in front of the housing through window 28 in mirror 44 in which the subject is reflected by reason of the reflective optical projection thereof denoted by the arrows 48 in FIG. 6.

At the same time, the top of the subject or object may be viewed from in front of the housing through window 26 in mirror 36 in which the top of the subject is reflected by reason of the reflective optical projection thereof denoted by the arrows 50 in FIG. 7.

To provide proper and accurate optical focus, the mirrors may be adjusted by the adjusting nuts 54, FIG. 8, and by virtue of the same adjustments the common point of optical focus of all three views of the subject in front of the housing may be adjusted or selected.

From the foregoing description it is seen that an educational teaching aid has been provided which visually presents the normal and technical third angle orthographic projection of a three dimensional object at a single common focal point outwardly from the teaching aid or device, thereby adapting the use of the instructional device for classroom or closed circuit television instruction.

The specific structures and components hereindescribed and disclosed are for illustrative purposes, and are not intended to limit the scope of the present invention beyond the requirements of the prior art and the hereinafter appended claims.

I claim:

1. A device for use in instructing three-view projection drawing comprising, a housing having three viewing windows arranged in one face thereof, means for supporting a drawing subject within said housing directly viewable through one of said windows, a reflective optical system associated with each of the two remaining windows, each said optical system being focused at right angles to the other on said subject support means, and each optical system including a reflective surface directly viewable through its associated window.

2. A device as defined in claim 1 wherein the second two windows are oriented 90° apart radially of said first viewing window.

3. A device as defined in claim 1 including a light source in said housing focused on said subject support means.

4. A device as defined in claim 1 wherein each optical system includes two reflective surfaces arranged in angular disposition to each other, and wherein one of said surfaces is optically focused on said subject support means and the other is focused outwardly of one of said viewing windows.

5. A device as defined in claim 4 wherein said reflective surfaces are adjustably secured within said housing.

6. A device for visual instruction in three-view projection drawing comprising, a housing, a viewing window in one face of the housing, means for supporting a drawing subject in said housing with one surface thereof directly viewable through said window, a second viewing window in said housing wall vertically aligned above said first housing, a reflective surface in said housing focused on the top of said drawing subject support means, a second reflective surface angularly disposed to the first and directly viewable through said second window, a third window in said housing wall horizontally aligned to one side of said first window, a reflective surface in said housing focused on the side of said subject support means, and a second reflective surface angularly disposed to the first and directly viewable through said third window.

7. A device as defined in claim 6 wherein a light source is fixed in said housing and focused on said drawing subject support means.

8. A device as defined in claim 6 wherein said reflective surfaces are adjustably secured in said housing.

References Cited
UNITED STATES PATENTS

| | | | |
|---|---|---|---|
| 1,289,286 | 12/1918 | Sliter | 35—58 X |
| 2,665,608 | 1/1954 | Clark | 35—26 |
| 3,271,882 | 9/1966 | Chuy | 35—58 X |

EUGENE R. CAPOZIO, *Primary Examiner.*

P. WILLIAMS, *Assistant Examiner.*